(12) United States Patent
Church et al.

(10) Patent No.: US 7,810,492 B2
(45) Date of Patent: Oct. 12, 2010

(54) RESPIRATOR

(75) Inventors: Colin Church, Herts (GB); Ian Dampney, Middlesex (GB)

(73) Assignee: Helmet Integrated Systems Limited, Letchworth, Hertfordshire (GB)

( * ) Notice: Subject to any disclaimer, the term of this patent is extended or adjusted under 35 U.S.C. 154(b) by 1036 days.

(21) Appl. No.: 10/550,765

(22) PCT Filed: Mar. 29, 2004

(86) PCT No.: PCT/GB2004/001395

§ 371 (c)(1),
(2), (4) Date: Sep. 11, 2006

(87) PCT Pub. No.: WO2004/084665

PCT Pub. Date: Oct. 7, 2004

(65) Prior Publication Data

US 2007/0044800 A1    Mar. 1, 2007

(30) Foreign Application Priority Data

Mar. 27, 2003 (GB) ................... 0307111.5
Oct. 24, 2003 (GB) ................... 0324880.4

(51) Int. Cl.
    *A61M 11/00* (2006.01)
(52) U.S. Cl. .............. 128/201.24; 128/201.25
(58) Field of Classification Search ...............
        128/201.22–201.25, 205.29, 205.27, 206.12, 128/204.21
    See application file for complete search history.

(56) References Cited

U.S. PATENT DOCUMENTS

| 4,136,403 | A | 1/1979 | Walther et al. |
| 4,713,844 | A | 12/1987 | Westgate |
| 4,905,687 | A | 3/1990 | Ponkala |
| 6,953,318 | B2 * | 10/2005 | Krugerke .................. 415/26 |
| 2001/0032348 | A1 | 10/2001 | Diaz et al. |
| 2002/0062830 | A1 * | 5/2002 | Meier et al. ............ 128/206.12 |
| 2007/0131228 | A1 * | 6/2007 | Croll et al. ............ 128/204.15 |
| 2007/0283961 | A1 * | 12/2007 | Hsieh .................. 128/205.29 |

FOREIGN PATENT DOCUMENTS

| DE | 3032371 A1 | 3/1982 |
| DE | 8714 490 U | 9/1988 |
| DE | 41 32 404 A | 4/1993 |
| DE | 298 20 078 U | 3/2000 |
| EP | 0225744 A1 | 11/1985 |
| EP | 0349191 A2 | 1/1990 |
| EP | 0602847 A1 | 6/1994 |
| EP | 1038553 A2 | 9/2000 |
| EP | 1197244 A2 | 4/2002 |
| FR | 2676652 A1 | 11/1992 |
| GB | 2032284 A | 5/1980 |
| GB | 2058577 A | 4/1981 |
| GB | 2130893 A | 6/1984 |
| GB | 2195037 A | 3/1988 |
| JP | 2000107304 A | 4/2000 |
| WO | WO 86 03656 | 7/1986 |
| WO | 01/80952 A1 | 11/2001 |

\* cited by examiner

*Primary Examiner*—Steven O Douglas
(74) *Attorney, Agent, or Firm*—Hodgson Russ LLP (57) ABSTRACT

A respirator helmet (10') or other helmet adapted to receive, by means of a plug (66) and socket arrangement (70), a pivotable bar (62) carrying a protective screen (63) such that the screen may be moved between a lowered position in front of the face of the wearer of the helmet and a raised position.

13 Claims, 10 Drawing Sheets

RESPIRATOR

The present invention relates to a respirator, or other helmet, for example, a visored protective helmet.

A respirator of self-contained form for use in oxygen-sufficient atmospheres is described in GB 2,183,488. The respirator includes a domed shell incorporating a harness for engagement with a user's head and having a visor depending from the front of its rim to extend over and round the user's face. The shell is spaced above the harness, and projects forwardly and rearwardly of the harness, to define a passageway which extends from a rear opening across the head and then downwardly over the face behind the visor. A battery-driven electric fan is located in the passageway adjacent its rear opening to draw ambient air into the opening to flow through the passageway. The shell is provided with a pad filter fitted across the passageway rear opening.

The protection afforded by such respirators is limited to a certain level of physical protection from the shell of the respirator and the chemical protection afforded by the filter.

In at least its preferred embodiment, it is an aim of the present invention to address this and other problems.

A first aspect of the invention provides a screen bar for a respirator helmet or other helmet as set out in claim 1. A screen bar of this sort may be used to add further protective elements (e.g. a welding shield) to the helmet. Further aspects provide a helmet adapted to receive such a screen bar, and a helmet and a screen bar in combination.

Furthermore, as the filter becomes blocked or as the voltage of the fan battery falls, the air flow through and the pressure within the respirator will fall, reducing the efficiency of the respirator and thus the protection afforded to the user. In order to detect the falling efficiency, it is known to mount devices within the respirator which provide a visual indication to the user that the degree of protection is falling. For example, GB 2,130,893 describes the mounting of a float-type pressure gauge within the respirator and the field of view of the user. However, such devices are unable to provide any active control of the air supply within the respirator.

In further embodiments, the present invention seeks to solve these and other problems.

Another aspect of the present invention provides a respirator comprising a hood for enclosing at least the face area of a user, a filter, a fan for generating a flow of air through the filter, a duct for delivering the flow of filtered air to the vicinity of the user's face, a bypass conduit for abstracting a portion of the flow from the duct and subsequently returning the abstracted portion to the remainder of the flow, means for measuring the flow rate of air through the bypass conduit and means for controlling the fan in response to the measured flow rate.

Other advantageous features are illustrated in the dependent claims, the description given below and the appended drawings.

Preferred features of the present invention will now be described with reference to the accompanying drawings, in which.

With reference to FIGS. 1 to 4, respirator 10 comprises a hood having a domed, impact resistant outer shell 12 attached to a rigid, inner shell 14 carrying a visor 16 pivotally attached thereto. The peripheral edge of the inner shell 14 is sealed to a head cowl 18 made to fit a range of head sizes of designated users. The cowl envelops the head of the user and, together with the inner shell 14 and visor 16, defines a breathing zone for the user 20. A neck seal 22 (FIG. 4) is attached to the cowl so as to seal in use around an upper part of a user's neck. Alternatively, the head cowl 18 may be incorporated in a full body suit.

Figure 1:
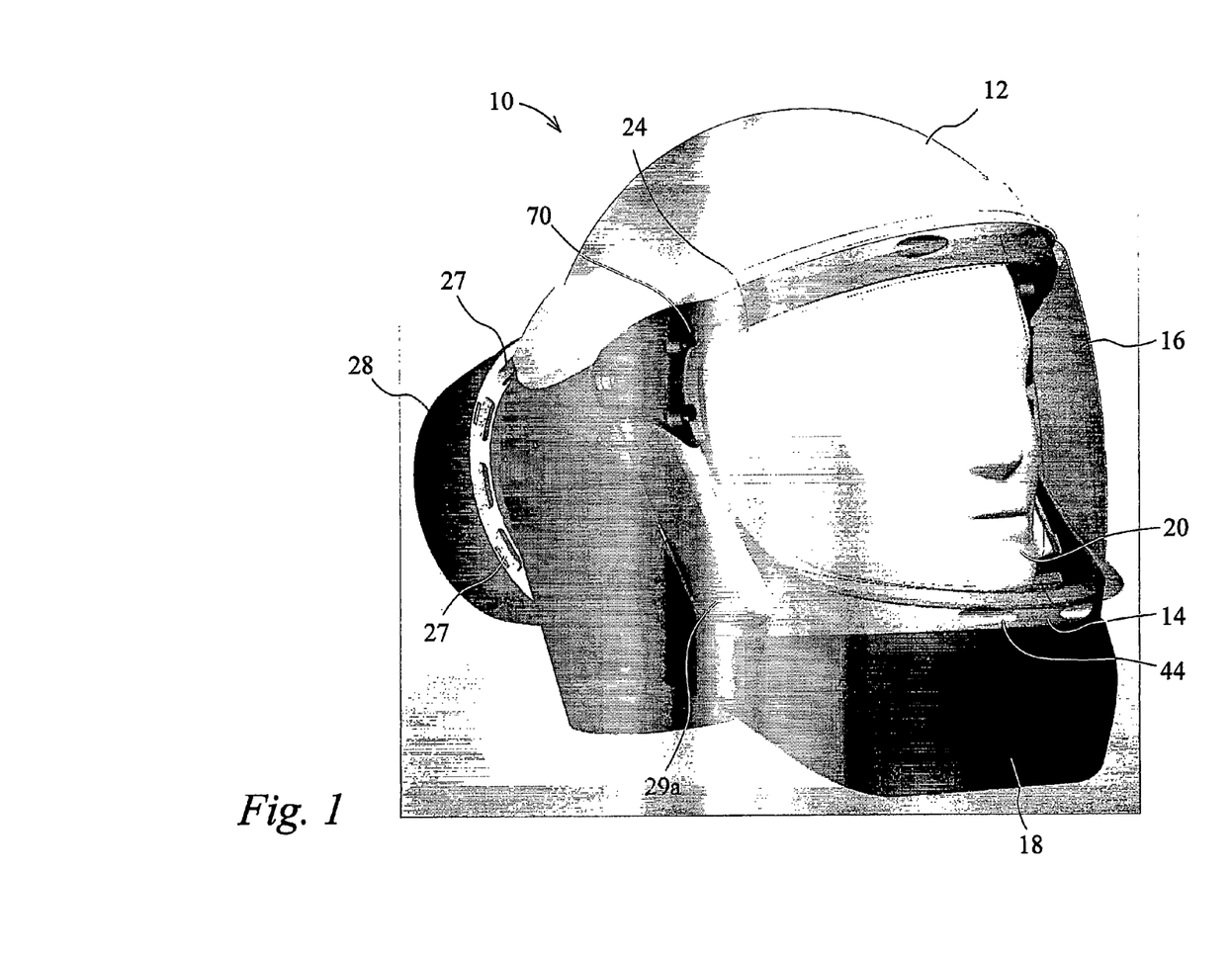
FIG. 1 is a side perspective view of a respirator.
Figure 2:
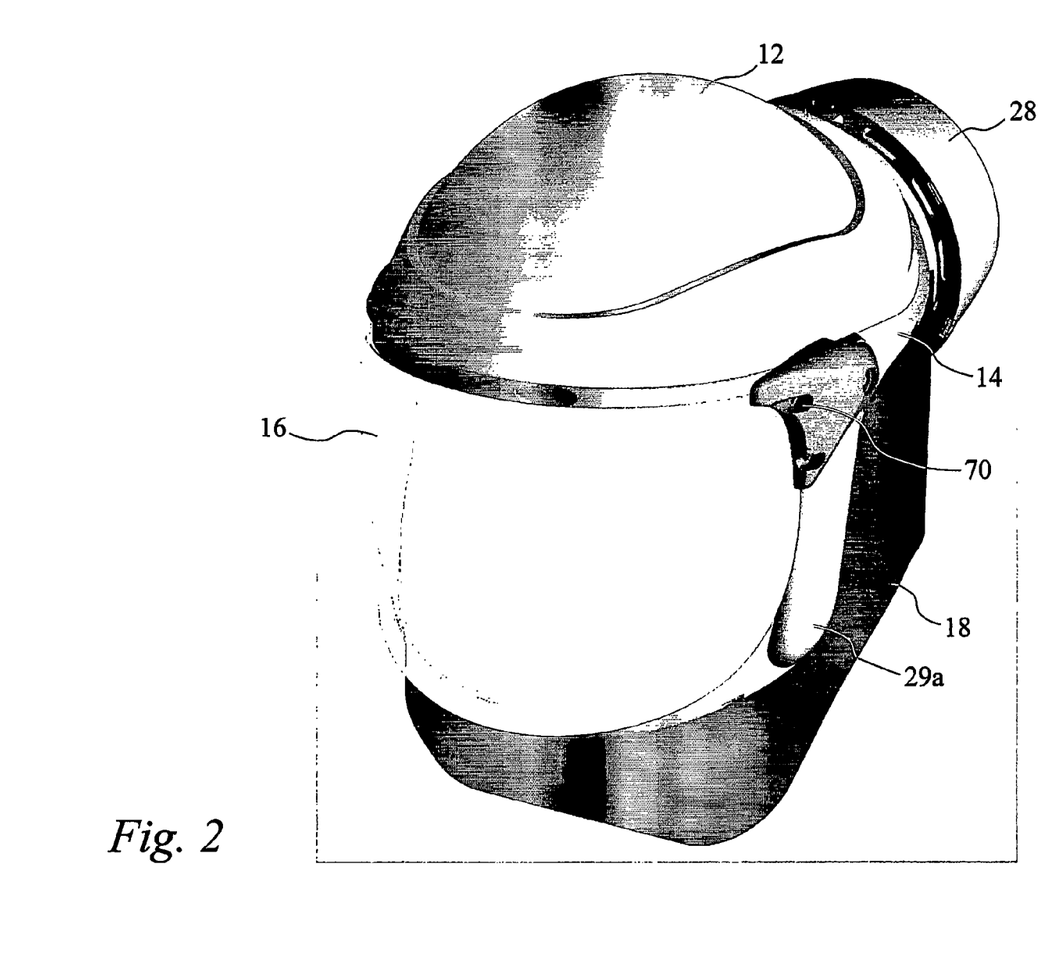
FIG. 2 is a perspective view of the respirator of FIG. 1.
Figure 3:
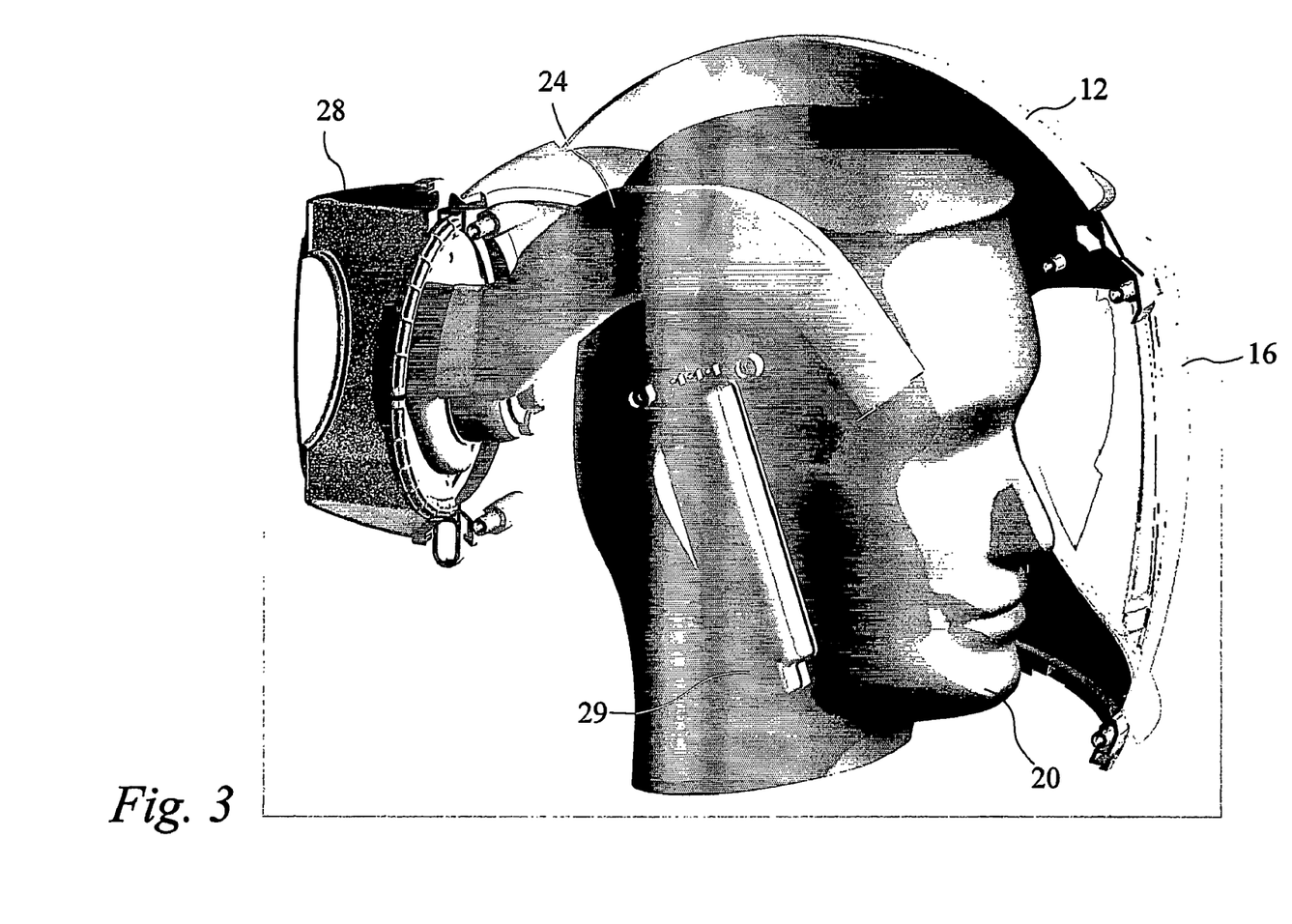
FIG. 3 is a side perspective view of the respirator of FIG. 1 with some components partially omitted to show the location of the air duct.
Figure 4:
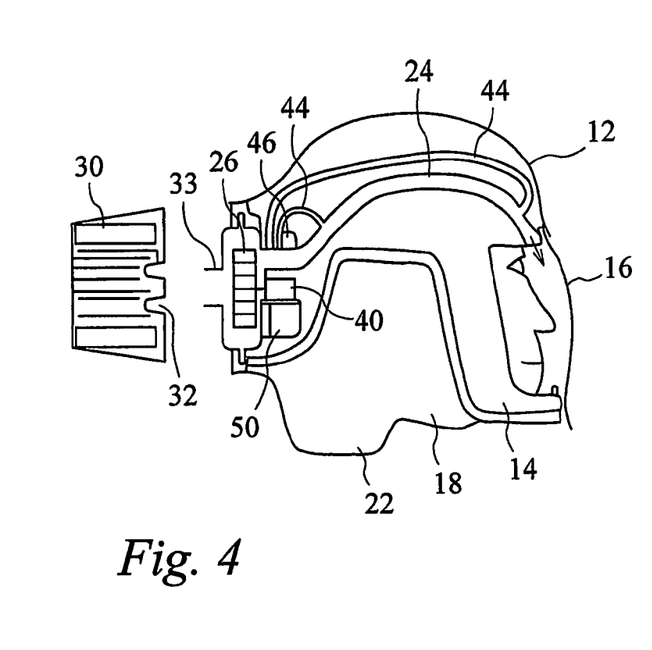
FIG. 4 illustrates a cross-sectional view of the respirator of FIG. 1.

Air is delivered to the breathing zone by an air delivery duct 24 extending from the rear of the inner shell 14 to deliver a flow of air in the vicinity of the face of the user 22. A fan 26 located at the rear of the inner shell 14 propels air through the duct 24. An air filter 28 is provided to filter air entering the fan 26 via air inlets 27. The fan 26 is powered by batteries 29 which may be either removably housed in compartments 29a located proximate the ears of the user on either side of the shell 14 (to provide for a low centre of gravity for the respirator), or otherwise provided in a belt pack strapped to the waist of the user 22. Exhalate from the breathing zone issues from the respirator 10 via one or more apertures 44 which may be valved in the lower portion of the respirator.

Figure 5:
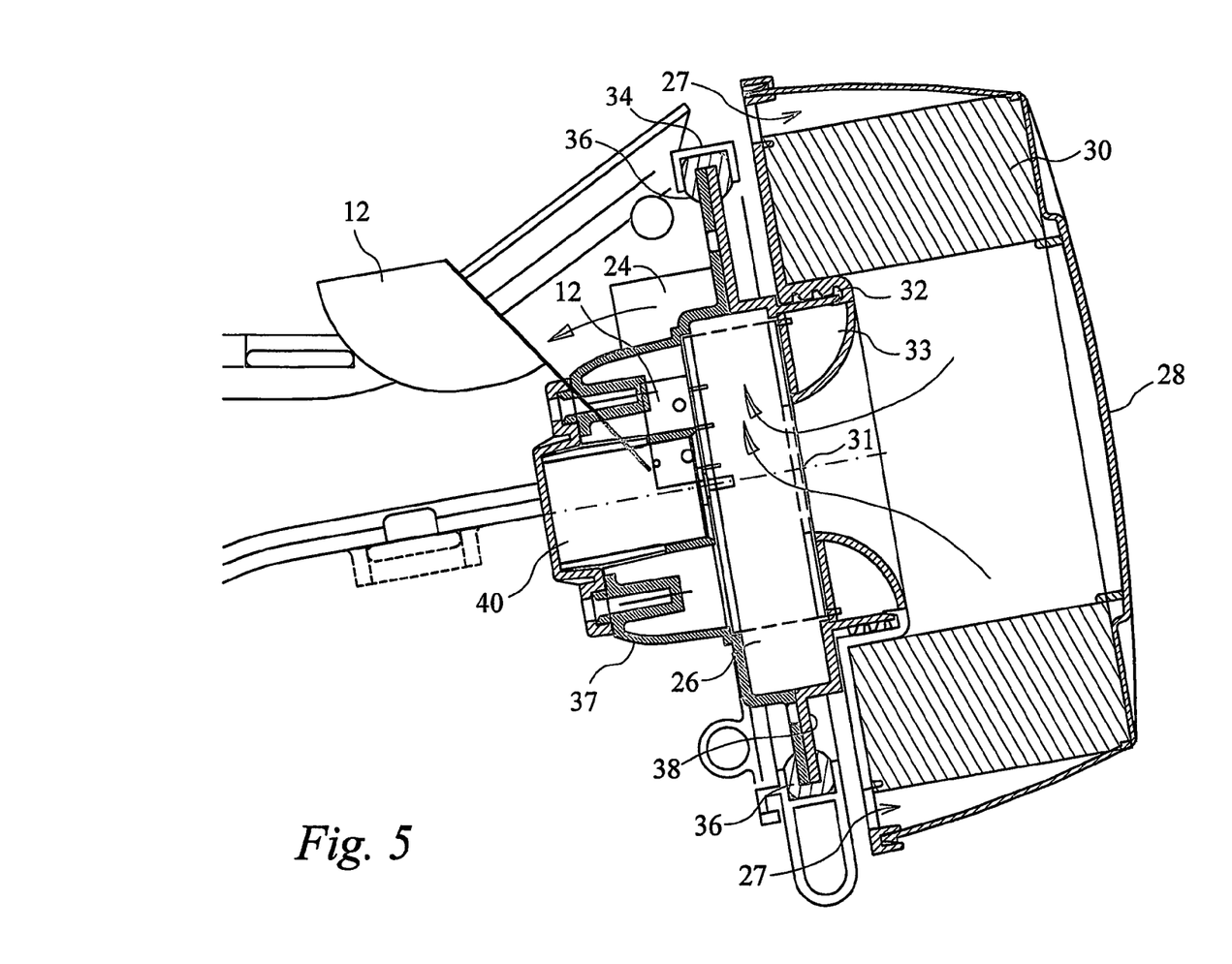
FIG. 5 illustrates a cross-sectional view of the filter and fan of the respirator.

With reference to FIGS. 4 and 5, air entering the air filter 28 through the air inlets 27 passes through pleated glass fibre papers 30 which filter the air flow, and leaves the filter 28 through a central aperture 31. The filter 28 carries a screw thread 32 to enable the filter 28 to be releasably secured to a conformingly profiled thread formed on the inlet structure 33 of the fan casing for ease of replacement of the filter. The fan 26 is a tangential fan in which the air is turned from parallel to the axis of rotation on entry to a direction tangential to the arc described by the tips of the rotating blades of the fan so as to be discharged through an elbow into the duct 24. The chassis 34 has a U-section annulus that holds a resilient anti-vibration mounting which, in turn, holds the two major parts 37, 38 of the fan casing. The fan motor 40 is directly mounted on to the fan 26, and is switched on and off by a microswitch operated by a quadrant arm 42 that rests against the user's head.

This arrangement of the air filter and fan serves to position the air filter closer to the back of the user's head, bringing the centre of gravity of the respirator close to the centre of the user's head. In addition, no recirculation plate is required; the inlet structure 33 preventing substantial recirculation.

Figure 6:
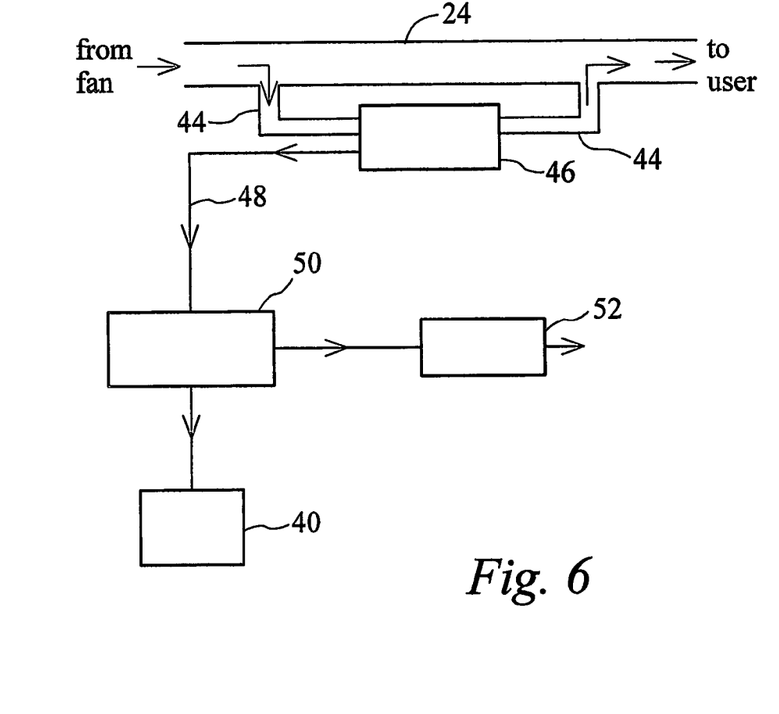
FIG. 6 illustrates a system for controlling a fan of the respirator of FIG. 1.

In order to control the air flow through the breathing zone, the respirator includes a system for controlling the speed of the fan 26. The respirator 10 includes a bypass conduit 44 for abstracting a portion of the air flow from the air delivery duct 24. With reference to FIGS. 4 and 6, air entering the bypass conduit 44 from the duct 24 flows into an air flow sensor 46, such as, for example, a Honeywell AWM series mass air flow sensor, and, from the sensor, back into the remainder of the air flow within the duct 24. Alternatively, the bypass conduit may exhaust directly into the breathing zone.

A mass air flow sensor typically comprises two temperature sensors, such as thermistors, within a conduit, one of each side (upstream and downstream) of a heater. The heat transfer characteristic of the heater is linked to the number of air molecules passing across it at a certain velocity. A signal output from the sensor is indicative of the mass flow rate within the bypass conduit 44, as determined from the temperature difference between the two temperature sensors. The signal 48 is received by a microprocessor 50, which determines from the signal the mass flow rate within the duct 24, the relationship between the flow in the duct 24 and the conduit 44 having being previously determined and programmed in the microprocessor. From the thus-measured flow rate in the duct 24, the microprocessor 50 controls the mark/space ratio of a signal output to the motor of the fan 26 in order to maintain a constant flow rate in the air duct 24. This enables any drop in the flow rate due, for example, to the gradual build-up of debris in the air filter 28 or loss of battery power, to be compensated for by increasing the fan speed.

Upon starting the system, the condition of the air filter is initially unknown, so the control signal output to motor for the fan initially has a predetermined mark/space ratio. This ratio is then adjusted coarsely according to the output from the detector 46 so that the flow rate falls rapidly within a target window, and then more accurately so that the flow rate is at a target value. The microprocessor 50 will then continually make small adjustments to the mark/space ration to maintain a target flow rate through the duct 24. A boost switch may be provided for use by the user to temporarily increase the air flow.

In order to alert the user 22 of a measured drop in the flow rate through the conduit, a display 52 connected to the microprocessor 50 is provided on the visor 14. For example, the display 52 may comprise a series of light emitting diodes, the diodes being illuminated progressively by the microprocessor 50 depending on the mark/space ratio of the signal supplied to the motor of the fan, the level of which is indicative of problems associated with, for example, the degree of blocking of the air filter.

Further embodiments will now be described which enable the wearer of a respirator to attach additional protection appropriate to an activity which he is to carry out while wearing the respirator (for example, a welding shield or a mesh visor).

Figure 7A:
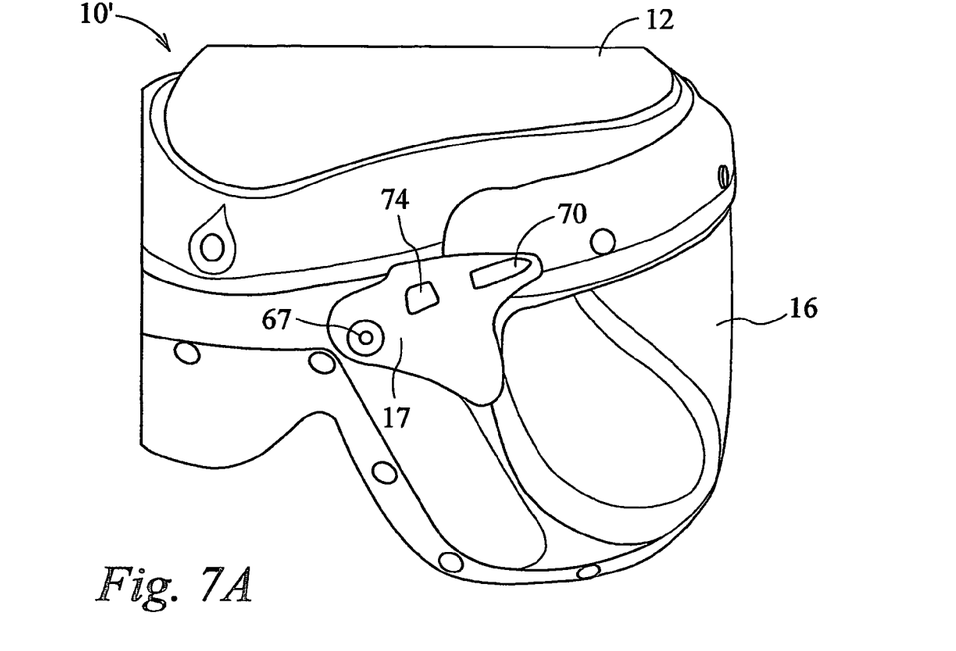
FIG. 7A illustrates a respirator adapted to receive a bar carrying a further protective screen.

FIGS. 7A and B show a respirator 10' generally in accordance with the foregoing (like numerals indicating like features) with the exception that the filter 28 is not visible in the figures. In addition to the features set out above, the respirator of this embodiment is adapted to receive a bar carrying a protective screen by means of a plug/socket arrangement, such that the screen is disposed in front of the wearer's face. The respirator is shown without the screen in FIG. 7A and with the screen 60 (in this case a welding shield) attached in FIG. 7B.

Figure 8:
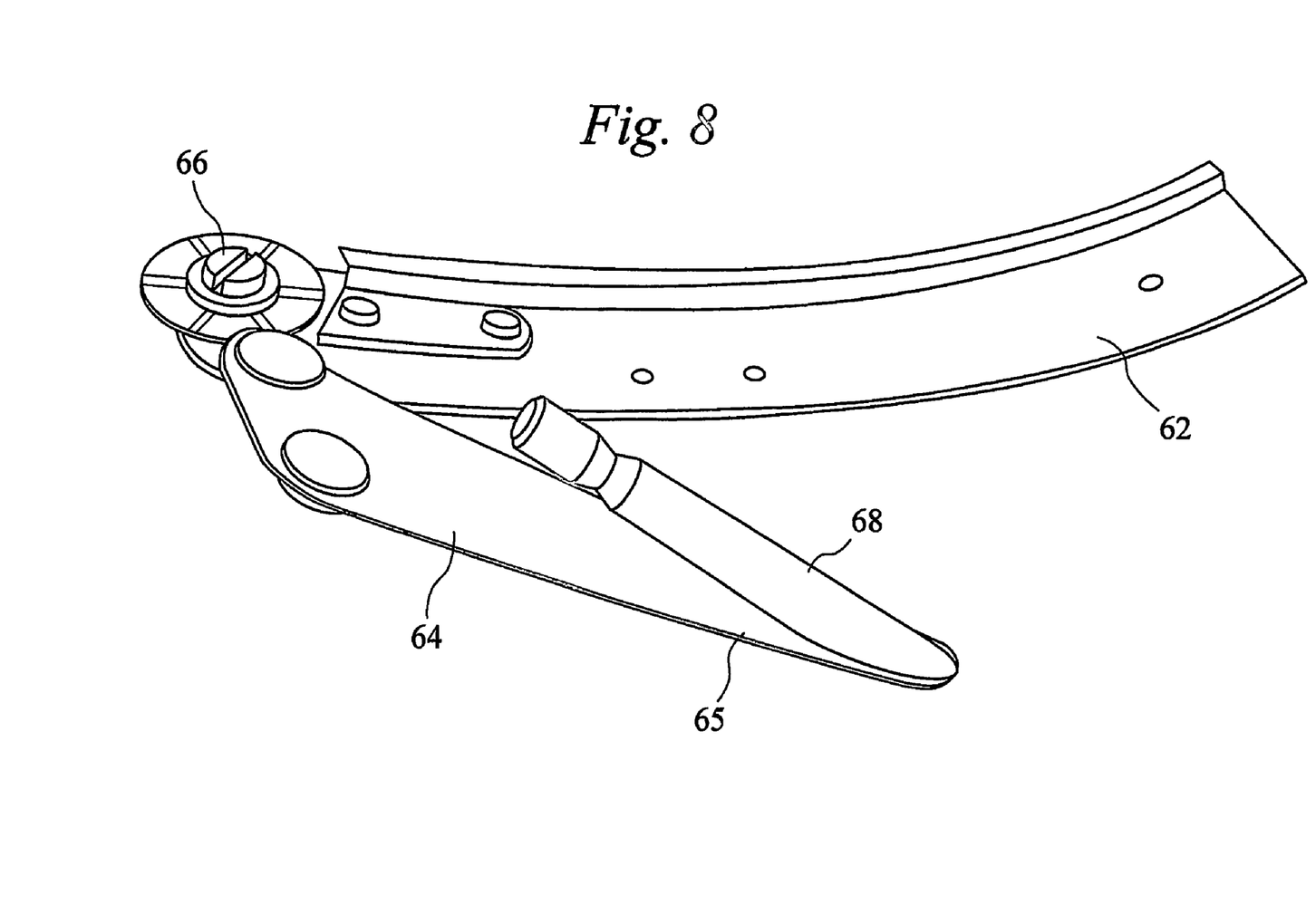
FIG. 8 shows an end of the bar, illustrating the mechanism by which it is fixed to the respirator.

The bar 62 is curved such that it conforms approximately to the shape of the outer shell 12 of the respirator. Each end of the bar 62 (one of which is shown in FIG. 8) is provided with a respective arm 64, an end of which is pivotably mounted to the end of the bar 62 by means of a respective pivot 66. The arrangement of the bar 62, the arms 64 and the rotation of the pivots 66 (being generally coaxial), is such that, with the arms held so that they are generally horizontal and at the same height, the bar can pivot generally upwards and downwards. At a lower end of the range of movement of the bar 62 relative to the arms 64 (in which the screen depending from the bar will be in front of the wearer of the respirator when the bar is attached thereto), the arms extend generally forwards (with respect to the wearer of the respirator) and are generally parallel with the bar 62. In this position, the bar 62 is constrained by the pivots 66 from further downward movement.

Figure 9:
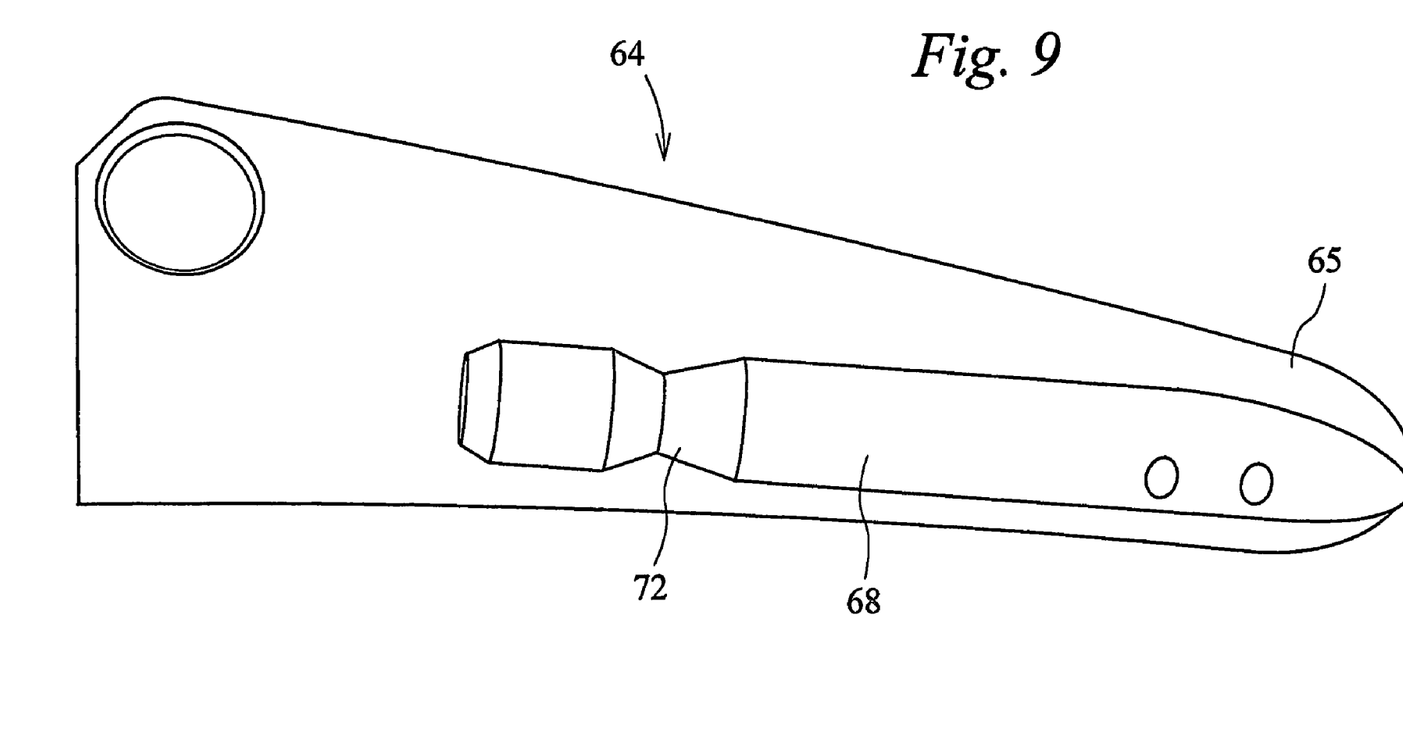
FIG. 9 shows an arm and rod forming part of the mechanism by which the bar is fixed to the respirator.

The free end 65 of each arm 64 carries a re-entrant (with respect to the curvature of the bar) plug in the form of a rod 68 (see FIG. 9) which extends from the end of the arm 64 remote from the pivot 66, generally in the direction of the pivot 66 but forming an acute angle with the arm 64 to which it is attached. Towards the free end of the rod 68, there is provided a circumferential detent 72, having an obtuse-angled, V-shaped cross-section.

Returning to FIGS. 1, 2 and 7A, each side of the outer shell 12 of the respirator is provided, adjacent the temple region thereof, with a respective socket in the form of a channel 70 extending in a generally fore-aft direction. In the embodiment shown, the channels 70 are provided on visor pivot covers 17 of the respirator slightly above and to the rear of pivots provided for the visor 16 itself. In this way, the screen 63 and the visor 16 may be raised together, or the screen 63 may be raised independently of the visor 16 whilst the respirator is being worn.

Figure 7B:
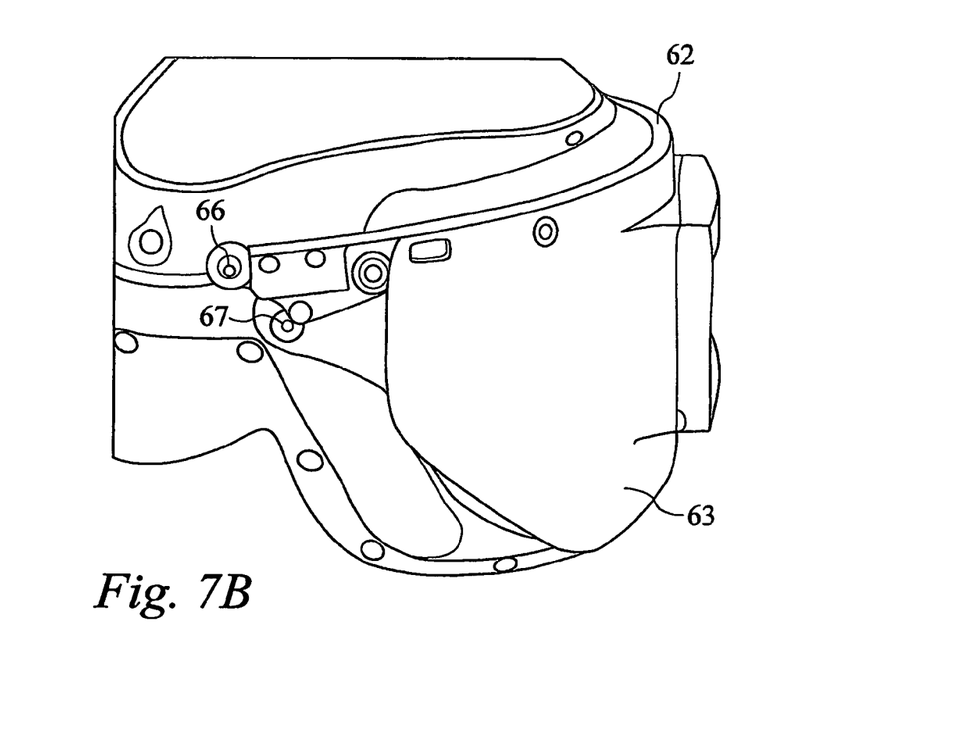
FIG. 7B illustrates the respirator of FIG. 7A with the bar and screen attached.
Figure 10:
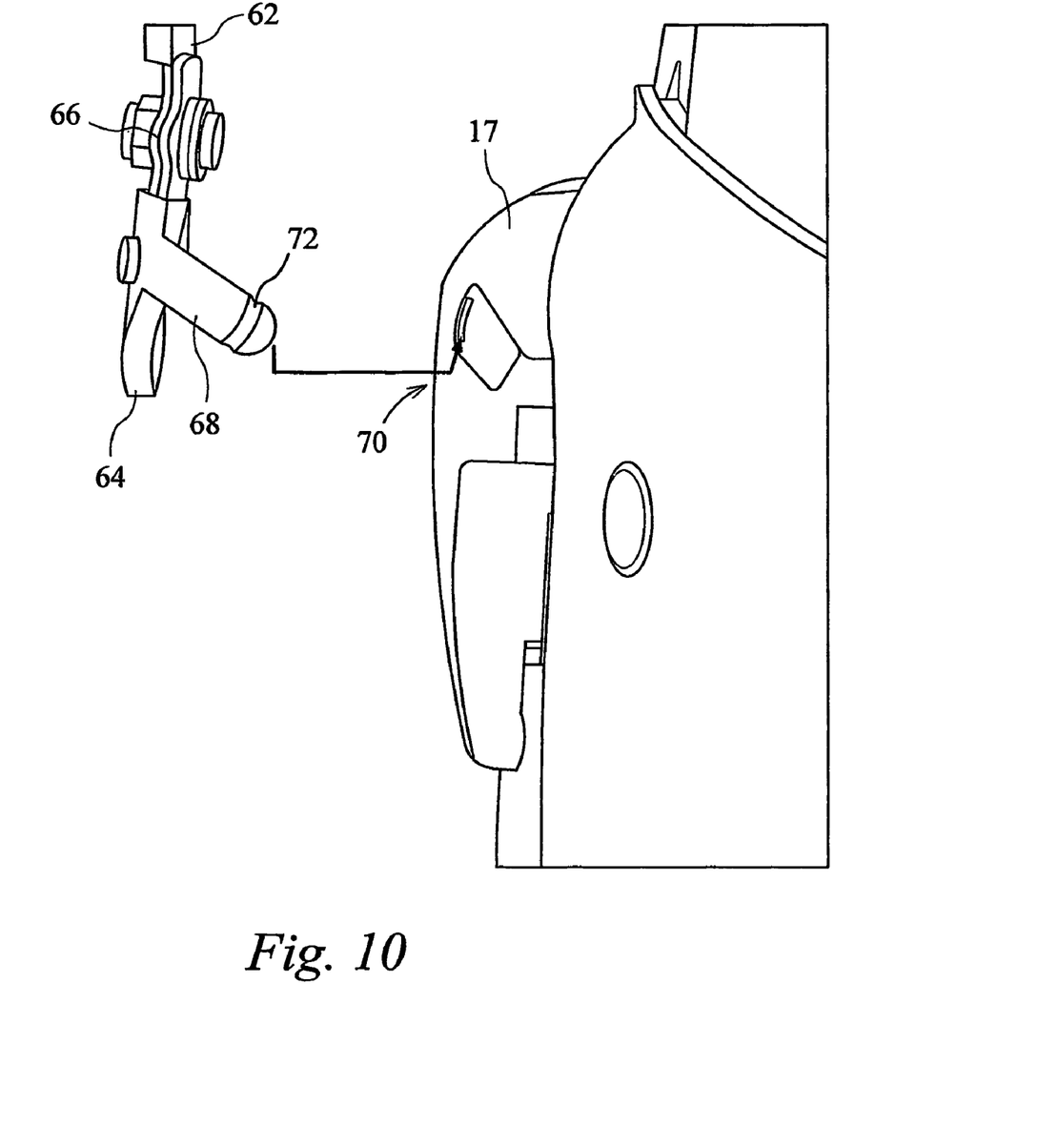
FIG. 10 illustrates the manner by which the bar is fixed to the respirator.
Figure 11:
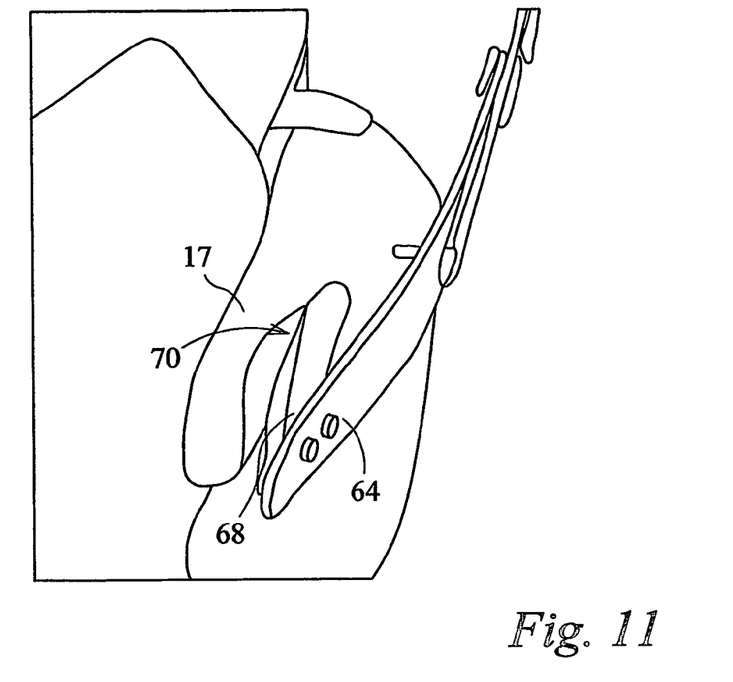
FIG. 11 is a detail view of the mechanism by which the bar is fixed to the respirator with the screen in a lowered position.
Figure 12:
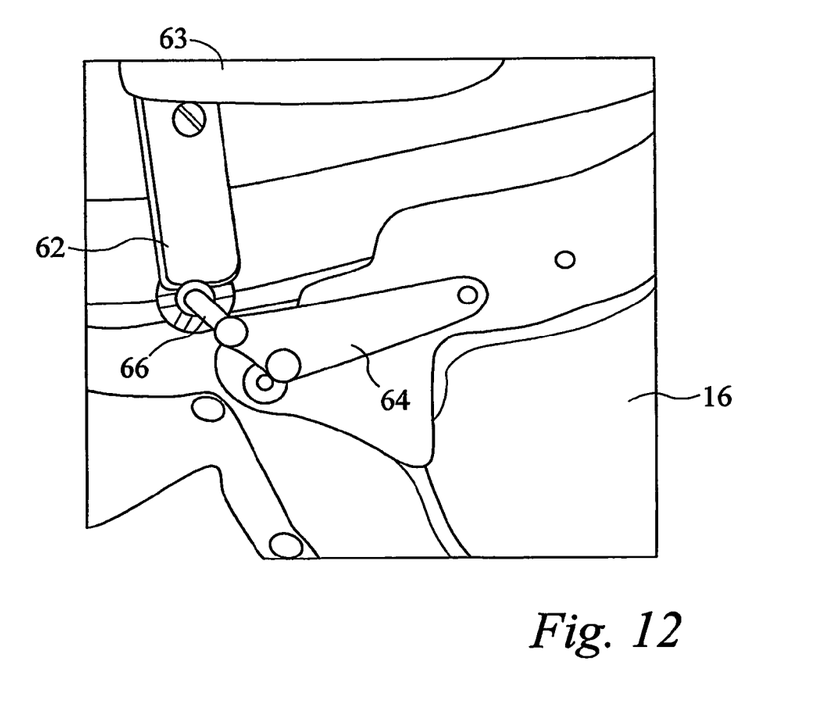
FIG. 12 is a detail view of the mechanism by which the bar is fixed to the respirator with the screen in a raised position.

With reference to FIGS. 7A, 10 and 11, each channel 70 is adapted to receive one of the rods 68 and to retain it by means of the detent 72 which engages with corresponding retaining structure 74 in the channel 70, such that a screen 60 depending from the bar 62 may be rotated from a lowered position (as shown in FIG. 7B), in which it is disposed in front of the wearer's face, to a raised position, in which the bar 62 extends generally across the top of the respirator and the screen 60 extends generally forwards and does not obstruct the wearer's view (a detail of which position is shown in FIG. 12).

With the screen bar (and attached screen) of this embodiment is fixed to the respirator, the wearer may raise and lower the screen whilst the helmet is being worn.

While this embodiment has been described with reference to its application to a respirator, it is equally applicable to other types of helmets not having a respirator function.

Each feature disclosed in this specification (which term includes the claims) and/or shown in the drawings may be incorporated in the invention independently of other disclosed and/or illustrated features.

The invention claimed is:

1. A respirator comprising a hood for enclosing at least the face area of a user, a filter, a fan for generating a flow of air through the filter, a duct for delivering the flow of filtered air to the vicinity of the user's face, a bypass conduit for abstracting a portion of the flow from the duct and subsequently returning the abstracted portion to the remainder of the flow, means for measuring the flow rate of air through bypass conduit and means for controlling the fan in response to the measured rate flow.

2. A respirator according to claim 1, wherein said measurement means comprises a mass air flow sensor.

3. A respirator according to claim 1, wherein the bypass conduit is arranged to return the airflow therethrough to the remainder of the flow in the duct.

4. A respirator according to claim 1, wherein the bypass conduct is arranged to return to the airflow therethrough to the remainder of the flow in a breathing zone of the respirator.

5. A respirator according to claim 1, wherein said control means is arranged to control power supplied to a motor of the fan depending on the measured flow rate.

6. A respirator according to claim 5, wherein the control means is adapted to control a mark/space ratio of a signal output to the fan motor.

7. A respirator according to claim 1, further comprising display means for providing a visual alert to a user of the respirator in the event of a reduction in the measured flow rate.

8. A respirator according to claim 6, further comprising display means for providing a visual alert to a user of the respirator in the event of a reduction in the measured flow rate and wherein the display means is adapted to generate the visual alert depending on the signal output to the motor.

9. A respirator according to claim 8, wherein the display means comprises a plurality of light emitting diodes arranged to be illuminated progressively dependant on the mark/space ratio of the signal.

10. A respirator according to claim 1, wherein the filter is removably fitted to inlet structure of a casing of the fan.

11. A respirator according to claim 1, wherein the fan is a tangential fan arranged to receive the filtered air flow from the filter substantially parallel to the axis of rotation of the blades of the fan and to discharge the air flow tangentially to the arc described by the tips of the blades into the duct.

12. A respirator according to claim 1, wherein the fan comprises a casing having two major parts which are held by an anti-vibration mounting.

13. A respirator according to claim 1, further comprising compartments adapted to be adjacent the ears of a user to accommodate batteries for driving the fan.

* * * * *